(12) United States Patent
Graumann et al.

(10) Patent No.: US 9,573,541 B2
(45) Date of Patent: Feb. 21, 2017

(54) SYSTEMS, METHODS, AND APPARATUS FOR IDENTIFYING AN OCCUPANT OF A VEHICLE

(75) Inventors: David L. Graumann, Portland, OR (US); Jennifer Healey, San Jose, CA (US); Carlos Montesinos, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 87 days.

(21) Appl. No.: 13/977,615

(22) PCT Filed: Dec. 29, 2011

(86) PCT No.: PCT/US2011/067830
§ 371 (c)(1),
(2), (4) Date: Mar. 19, 2014

(87) PCT Pub. No.: WO2013/101054
PCT Pub. Date: Jul. 4, 2013

(65) Prior Publication Data
US 2014/0195477 A1    Jul. 10, 2014

(51) Int. Cl.
*G05B 19/00* (2006.01)
*B60R 16/037* (2006.01)
(Continued)

(52) U.S. Cl.
CPC ............ *B60R 16/037* (2013.01); *B60W 40/08* (2013.01); *G06F 17/3053* (2013.01);
(Continued)

(58) Field of Classification Search
CPC .. B60R 16/037; B60W 40/08; G06K 9/00362; H04L 63/0861; H04L 63/102
See application file for complete search history.

(56) References Cited

U.S. PATENT DOCUMENTS 5,686,765 A * 11/1997 Washington ............ B60R 25/04
                                                          180/287
6,252,978 B1 * 6/2001 Grantz .................. B60R 25/252
                                                          180/272
(Continued)

FOREIGN PATENT DOCUMENTS

CN      1664290 A      9/2005
EP      1571601 A2     9/2005
(Continued)

OTHER PUBLICATIONS

Office Action for Japanese Patent Application 2014-550262 mailed Jul. 7, 2015. 4 pages Japanese Office Action, 3 pages English Translation.
(Continued)

*Primary Examiner* — Jennifer Mehmood
*Assistant Examiner* — Rufus Point
(74) *Attorney, Agent, or Firm* — Sutherland Asbill & Brennan LLP

(57) ABSTRACT

Certain embodiments of the invention may include systems, methods, and apparatus for identifying an occupant of a vehicle. According to an example embodiment of the invention, a method is provided for identifying an occupant of a vehicle. The method includes receiving a primary identification (ID) input and one or more secondary ID inputs, wherein the primary ID input comprises identification token information; retrieving cluster information based at least on the primary ID input; comparing the one or more secondary ID inputs with the cluster information; determining a confidence value associated with the identification of the occupant based at least in part on the comparison of the one or more secondary ID inputs with the cluster information; and outputting information based at least in part on the determined confidence value.

30 Claims, 6 Drawing Sheets

(51) Int. Cl.
*G06F 17/30* (2006.01)
*B60W 40/08* (2012.01)
*H04L 29/06* (2006.01)
*G06K 9/00* (2006.01)

(52) U.S. Cl.
CPC . *G06K 9/00369* (2013.01); *B60W 2040/0809* (2013.01); *G06K 9/00362* (2013.01); *H04L 63/0861* (2013.01); *H04L 63/102* (2013.01)

(56) References Cited

U.S. PATENT DOCUMENTS

| | | | | |
|---|---|---|---|---|
| 7,471,832 | B2* | 12/2008 | Luo | G06K 9/00362 280/735 |
| 7,812,712 | B2* | 10/2010 | White | A61B 5/117 180/272 |
| 7,898,385 | B2* | 3/2011 | Kocher | G07C 9/00087 340/5.52 |
| 8,344,849 | B2* | 1/2013 | Larsson | B60R 25/25 340/426.11 |
| 8,395,478 | B2* | 3/2013 | Diab | G06F 21/32 340/10.4 |
| 8,547,214 | B2* | 10/2013 | Basson | B60K 28/063 340/438 |
| 8,866,581 | B1* | 10/2014 | Leblang | H04L 63/0853 340/10.1 |
| 8,903,593 | B1* | 12/2014 | Addepalli | H04W 4/046 701/29.1 |
| 2004/0002894 | A1* | 1/2004 | Kocher | G07C 9/00087 705/13 |
| 2004/0129478 | A1* | 7/2004 | Breed | B60N 2/002 180/273 |
| 2004/0156535 | A1* | 8/2004 | Goldberg | G03D 15/001 382/115 |
| 2004/0263323 | A1* | 12/2004 | Seike | B60R 25/1004 340/426.1 |
| 2005/0193212 | A1 | 9/2005 | Yuhara | |
| 2006/0097844 | A1 | 5/2006 | Nakashima et al. | |
| 2006/0136744 | A1* | 6/2006 | Lange | G06K 9/00536 713/186 |
| 2006/0219776 | A1* | 10/2006 | Finn | B60R 25/25 235/380 |
| 2007/0124599 | A1 | 5/2007 | Morita et al. | |
| 2007/0200663 | A1* | 8/2007 | White | A61B 5/117 340/5.31 |
| 2008/0106390 | A1* | 5/2008 | White | B60K 26/02 340/426.11 |
| 2008/0170758 | A1* | 7/2008 | Johnson | G06K 9/00885 382/115 |
| 2008/0252412 | A1* | 10/2008 | Larsson | B60R 25/25 340/5.2 |
| 2008/0253619 | A1 | 10/2008 | Hagino et al. | |
| 2010/0010325 | A1* | 1/2010 | Ridder | A61B 5/0075 600/310 |
| 2010/0209889 | A1* | 8/2010 | Huang | B60W 40/09 434/65 |
| 2010/0311482 | A1* | 12/2010 | Lange | A61B 5/0404 463/1 |
| 2012/0078473 | A1* | 3/2012 | Ridder | A61B 5/0071 701/45 |
| 2012/0143392 | A1* | 6/2012 | Lurie | B64C 13/04 701/1 |
| 2012/0150541 | A1* | 6/2012 | Talwar | G10L 15/065 704/249 |
| 2012/0166018 | A1* | 6/2012 | Larschan | G07C 5/085 701/1 |
| 2015/0045984 | A1* | 2/2015 | Hui | B60R 16/02 701/1 |

FOREIGN PATENT DOCUMENTS

| | | |
|---|---|---|
| JP | 2007-145200 | 6/2007 |
| JP | 2009-087232 | 4/2009 |
| JP | 201036699 | 2/2010 |
| JP | 2010231320 | 10/2010 |
| WO | 2013/101054 A1 | 7/2013 |

OTHER PUBLICATIONS

International Search Report and Written Opinion received for PCT Application No. PCT/US2011/067830, mailed on Sep. 27, 2012, 10 pages.
International Preliminary Report on Patentability and Written Opinion received for PCT Patent Application No. PCT/US2011/067830 mailed on Jul. 10, 2014, 7 Pages.
Chinese Office Action received in Patent Application No. 201180075911.5, mailed Jan. 19, 2016, 17 pages, no translation available.
Office Action for Chinese Patent Application No. 2011/80075911.5, mailed Sep. 9, 2016, 18 pages (Translation Not Available).
Office Action for Japanese Patent Application No. 2014/550262, mailed Sep. 9, 2016, 10 pages (4 pages JP OA, 6 pages translation).
Extended European Search Report for European Patent Application No. 11/878,583.1, mailed Dec. 5, 2016, 8 pages.

* cited by examiner

SYSTEMS, METHODS, AND APPARATUS FOR IDENTIFYING AN OCCUPANT OF A VEHICLE

FIELD OF THE INVENTION

This invention generally relates to recognition systems, and in particular, to systems, methods, and apparatus for identifying an occupant of a vehicle.

BACKGROUND OF THE INVENTION

When a person gets into a car and prepares to drive, he/she will usually adjust a number of settings within the vehicle, including the seat position, the rear view mirror angle, climate control settings, etc. In some vehicles, the seats can have a number of adjustable settings, including backrest angle, fore-and-aft position, lumbar position, seat depth, seat height, etc. The array of seat positions can present a challenge, for example, when the vehicle is shared and different occupants have their own unique seat adjustment preferences.

Vehicle designers and manufacturers have attempted to address this issue by installing memory controls and motorized actuators so that seats, mirrors, pedals, etc., can be adjusted to a previously memorized position with a push of a single button. Some vehicles can associate memorized settings with a specifically numbered key fob, for example, to set seats to specific memory positions when the car is unlocked with a specific key fob. But if key sets are traded or borrowed, the wrong preference settings may be presented to the occupant and may create an annoyance or safety hazard.

BRIEF DESCRIPTION OF THE FIGURES

Reference will now be made to the accompanying figures and flow diagrams, which are not necessarily drawn to scale, and wherein.

DETAILED DESCRIPTION

Figure 1:
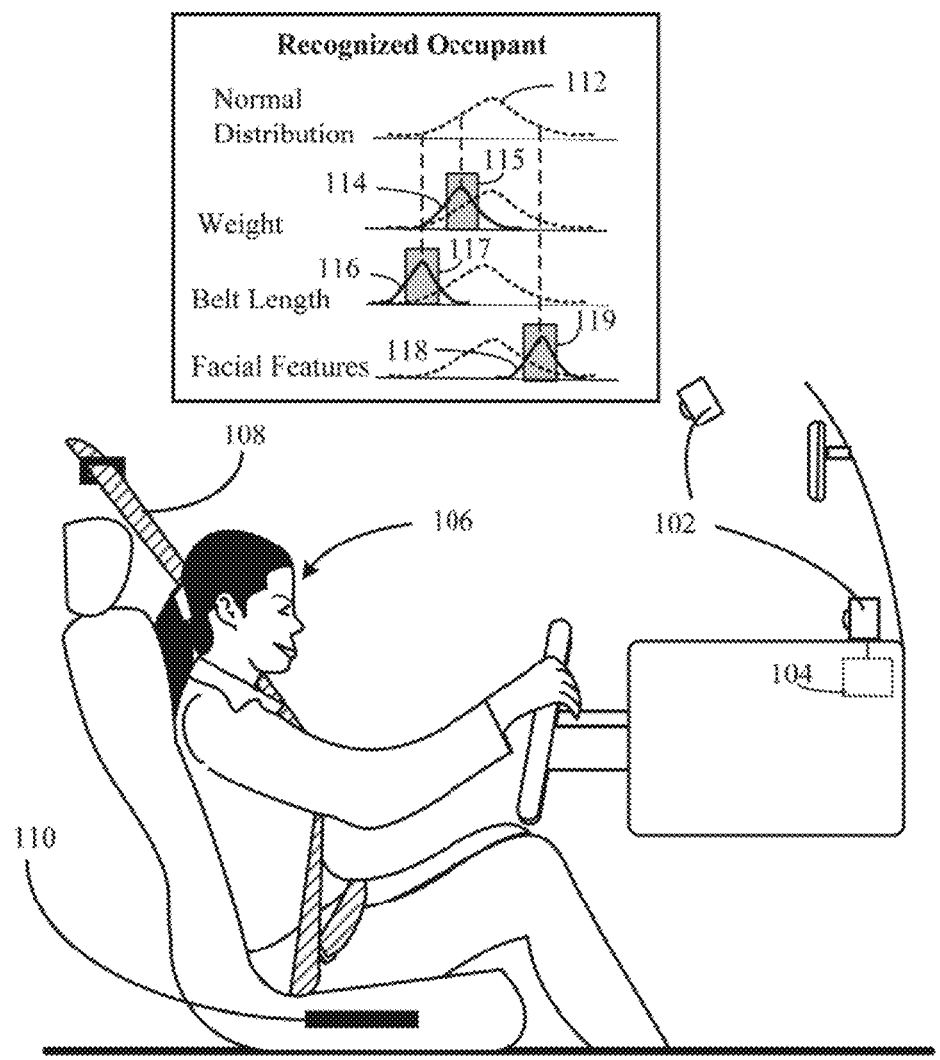
FIG. 1 is an illustrative example of a vehicle occupant recognition system arrangement with a recognized occupant, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is understood that embodiments of the invention may be practiced without these specific details. In other instances, well-known methods, structures, and techniques have not been shown in detail in order not to obscure an understanding of this description. References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified, the use of the term vehicle can include a passenger car, a truck, a bus, a freight train, a semi-trailer, an aircraft, a boat, a motorcycle, or other motorized vehicle that can be used for transportation. As used herein, unless otherwise specified, the use of the term occupant can include a driver, user, or a passenger in a vehicle. As used herein, the term training can include updating or altering data based, at least in part, on new or additional information.

Certain embodiments of the invention may enable control of devices based on a sensed identity or lack thereof. A plurality of sensors may be used in a motor vehicle to learn and/or sense an identity of an occupant. According to an example embodiment, one or more functions related to devices associated with the motor vehicle may be triggered or controlled by the sensed identity or lack thereof. According to example embodiments of the invention, devices that may be controlled, based at least in part on a profile associated with the identity sensing, can include settings associated with seats, pedals, mirrors, climate control systems, windows, a sun roof, vehicle displays, sound systems, navigation systems, alerting systems, braking systems, communication systems, or any other comfort, safety, settings, or controls related to a motor vehicle.

In accordance with example embodiments of the invention, an identity and profile of an occupant may be learned and/or sensed by processing information received from two or more sensors within a vehicle. According to example embodiments, the sensors can include a camera, a weight sensor, a safety belt position sensor, a microphone, a radio frequency identification (RFID) reader, a Bluetooth transceiver, and/or a Wi-Fi transceiver. These sensors may be utilized in conjunction with the other sensors in the vehicle to obtain information for identifying or learning the identity of an occupant. According to example embodiments, the sensors may be utilized to provide additional information for ascertaining a confidence value for associating the information with a probable identity. According to an example embodiment, once a personal profile is established, the profile may be shared with another vehicle, for example, to provide consistency across various vehicles for a particular driver or occupant.

Certain embodiments of the invention may enable learning and associating personal devices and/or physical features of an individual driver with that individual's personal preferences, settings, and/or habits. Example embodiments may obtain and learn these preferences without cognizant input from the driver. According to example embodiments, the sensors may be utilized to monitor or observe an occupant in the process of setting vehicle mirrors, seat position, steering position, temperatures, dash options, and other adjustable attributes. According to an example embodiment, the sensors may detect when the adjustments are in a transient-state and/or when they are in a steady-state, for example, so that settings associated with the adjustments are memorized after a steady-state has been reached, and not while the driver is in the process of adjustment.

According to example embodiments, configurations, settings, restrictions, etc., may be placed on the operation of the vehicle based on the identity of the driver or occupants. According to example embodiments, a wireless communication system may be included for communicating, for example, with a remote server so that an owner of a vehicle may configure settings, restrictions, etc., for the vehicle without needing to be in the car. In other example embodiments, the configurations, settings, restrictions, etc., may be set from within the vehicle. According to an example embodiment, the car may be placed in a "no-new users" mode that may disable the ignition if a previously unknown (or unlearned) driver attempts to start or drive the vehicle. In one embodiment, one or more restrictions may be imposed based on various actions of the driver, or upon sensed aspects associated with the vehicle. For example, an identified driver may be exceeding the speed limit. According to an example embodiment, the vehicle may be placed in a mode, for example, that instructs the driver to "pull the car over at the next available stop," so that the owner may query the driver via cell phone, or disable the vehicle remotely without creating a safety issue. Similar example embodiments as described above may be utilized for preventing the theft of the vehicle.

According to an example embodiment, an occupant may open the vehicle door with a key, for example, that may include a radio frequency identification (RFID) or other identifying chip embedded in a portion of the key fob. Such information may be used as partial information for identifying the driver. In other example embodiments, the vehicle door may include a keyless code, and the driver may open the door via a personal code and provide identity information via the code. An unauthorized user, for example, may obtain a code, and a key fob may be borrowed or stolen. According to an example embodiment, the code or key fob may be utilized as partial information to identify an occupant, but as will now be discussed, additional information may be sensed to provide a higher level of security or confidence in the actual identity of the occupant.

Various components, systems, methods, and arrangements may be utilized for identifying and/or learning an identity of an occupant of a vehicle, according to example embodiments, and will now be described with reference to the accompanying figures.

FIG. 1 is an illustrative example of a vehicle occupant recognition system arrangement with a recognized occupant, according to an example embodiment of the invention. In an example embodiment, two or more sensors may be utilized for determining or estimating an occupant's identity. For example, the personal entry code may be read with a keypad, or information from a key fob or other personal device may be read with a Bluetooth, WiFi, or RFID reader 104 and may provide partial "ground information" that may be used in conjunction with other sensed information to identify an occupant.

According to an example embodiment, the camera 102 may capture images of the driver 106, and the images may be processed to identify features associated with the driver including skin tone, facial features, eye spacing, hair color, shape, etc. According to an example embodiment, a camera 102 may be placed, for example, on the dash or in any other convenient location in or on the vehicle for capturing images associated with the driver 106. In other example embodiments, the camera 102 may be placed in other locations on the vehicle, and reflection components may be utilized for directing the camera field of view to regions of interest.

Certain example embodiments provide for situations when the driver 106 may be wearing a hat or sunglasses, or when the lighting in the cabin is too bright or too dim to be within a preferred dynamic range for the camera and image recognition processing. In this example embodiment, other sensed information may be utilized and weighted accordingly.

According to an example embodiment, one or more safety belts 108 within the vehicle may include optically identifiable markings that can be detected by the camera 102 and analyzed to determine the buckled length. This information may be used in conjunction with other sensors and with other features captured in the camera image to determine the identity of the driver 106.

According to an example embodiment, a weight sensor 110 may be utilized to determine an approximate weight of the driver 106. According to example embodiments, the weight sensor 110 may be used in conjunction with the other sensors and with other features captured in the camera image to determine the identity of the driver 106.

The inset box shown in FIG. 1 illustrates a recognition of an occupant 106 based on measured features including weight, safety belt length, and facial information, according to an example embodiment. Average values or vectors that may fluctuate over time (and/or from measurement-to-measurement) may represent measured features associated with a particular occupant. For example, weight can change; clothing may be bulky on cold days; sunglasses may be used intermittently, etc. According to an example embodiment, and for illustration purposes, a general population may have features represented by a normalized distribution 112. But an individual from the general population may have measured features (weight, safety belt length, facial features, vectors, etc.) that fall within a particular narrow range in comparison to the normalized distribution 112. For example, the weight sensor 110 may be used to obtain one or more weight measurements when an occupant 106 enters the vehicle. Multiple measurements over time may produce a weight measurement curve 114 having a certain mean and variance. According to an example embodiment, the weight measurement 114 mean or average (or a single measurement value) may be compared with weight data to determine if a previously defined weight signature region 115 exists that matches the weight measurement 114 within certain predefined bounds. If so, this may be a partial indication of the probability that the driver 106 matches a previously learned identity profile. According to an example embodiment, a similar process may be carried out for a safety belt length measurement 116 and a facial feature measurement 118, with processes to determine if there are corresponding matches with a safety belt signature region 117 and a facial feature signature region 119. According to an example embodiment, the combination of matching measurements 114, 116, 118 with corresponding signature regions 115, 117, 119, along with key fob information, etc., may provide a certain level of confidence for confirming an identity of the driver 106 or other occupant. According to an example embodiment, this process may also be utilized for determining if an occupant is not recognized by the system, as will be discussed in reference to the next figure.

Figure 2:
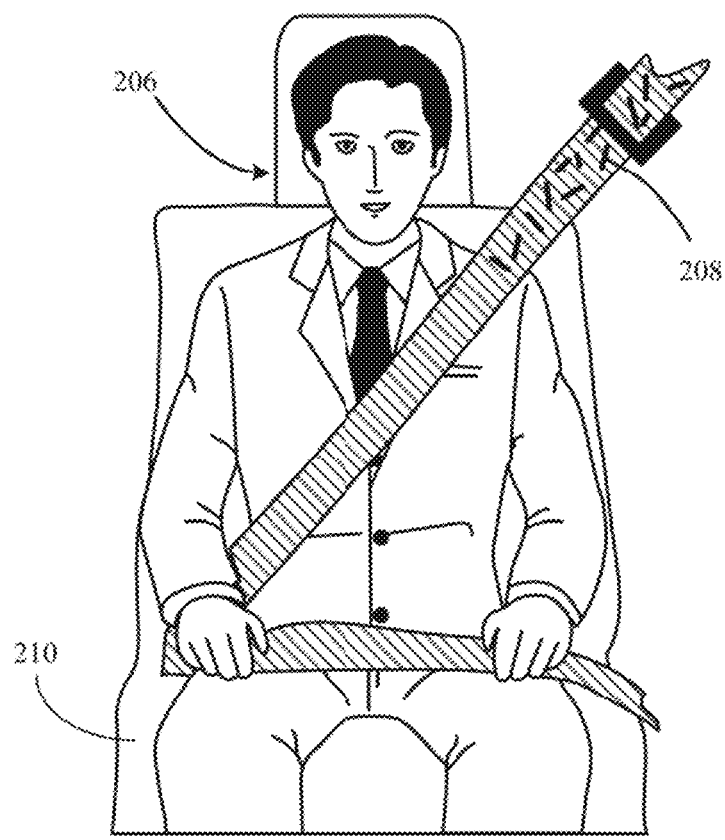
FIG. 2 is an illustrative example of an unrecognized occupant, according to an example embodiment of the invention.
Figure 2:
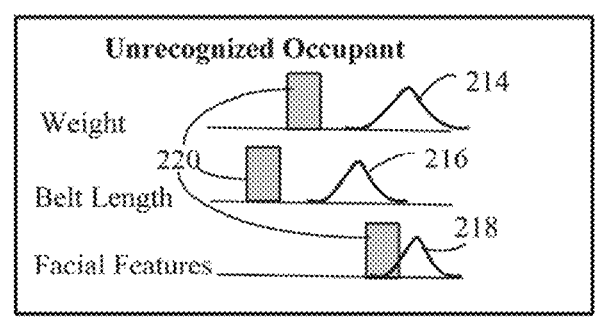

FIG. 2 is an illustrative example of an unrecognized occupant 206, according to an example embodiment of the invention. In an example embodiment, a weight sensor 210 may be utilized to obtain a weight measurement 214 of the occupant 206. In an example embodiment, a camera (for example, the camera 102 of FIG. 1) may be utilized to obtain one or more images of the safety belt 208, which may include an optically recognizable fiducial marking pattern for determining the buckled safety belt length measurement 216. According to an example embodiment, the camera (for example, the camera 102 of FIG. 1) may be utilized to obtain one or more images of the occupant 206 for determining a facial feature measurement or vector 218.

The inset box in FIG. 2 depicts an example where the measured values 214, 216, 218 do not match well with corresponding signature regions 220. According to an example embodiment, the signature regions 220 may correspond to a known or previously learned identity having the closest combined match with the measured values 214, 216, 218. According to an example embodiment, if a correlation between the signature regions 220 and the measured values 214, 216, 218 is not above a certain threshold, then a certain action or set of actions may be performed based on system preferences. For example, if the system is set for "no new drivers," the vehicle may not start if the unrecognized occupant 206 is in the driver seat. According to another example embodiment, if the system is set to "learn new drivers," then a set of actions may be performed to memorize the measured values 214, 216, 218 and begin learning (and remembering) the identity of the unrecognized occupant 206.

Figure 3:
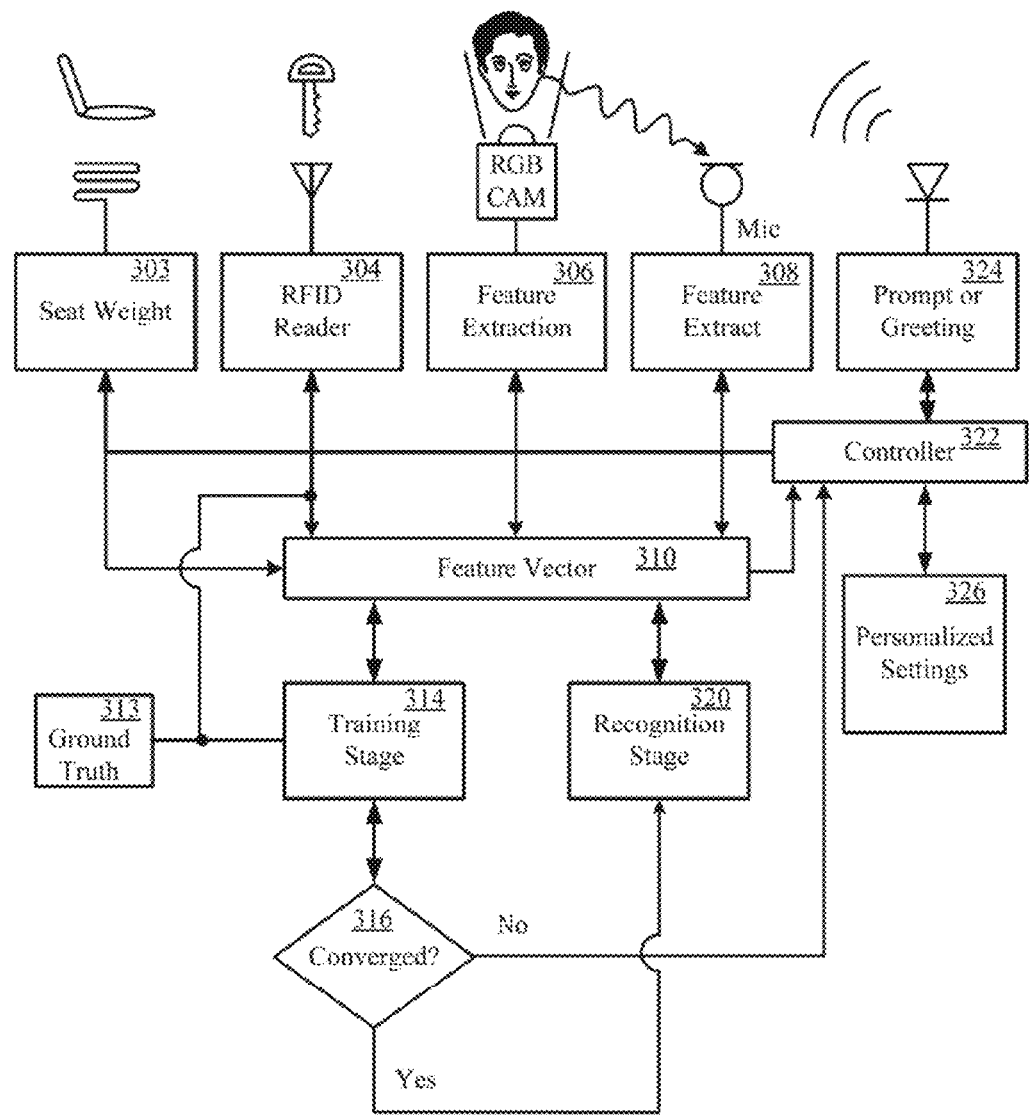
FIG. 3 is a block diagram of illustrative identification processes, according to an example embodiment of the invention.

FIG. 3 depicts a block diagram of illustrative identification processes, according to an example embodiment of the invention. Some of the blocks in FIG. 3 may represent hardware-specific items, while other blocks may represent information processing or signal processing. According to an example embodiment, measurements may be obtained from sensors, and the resulting feature vector information 310 may be utilized for training, learning, identifying, prompting, etc. According to an example embodiment, the sensors may include a seat weight sensor 303, a RFID reader 304, a camera with a associated image feature extraction module or processor 306, and a microphone with an associated speech recognition or feature extraction module or processor 308.

According to an example embodiment, an input may also be provided for obtaining a ground truth 313. According to an example embodiment, a ground truth 313 may be considered a very reliable linkage between the occupant and a particular identity. Examples of the ground truth 313 may include, but are not limited to, a social security number, a secure password, a biometric scan, a secure token, etc. According to an example embodiment, the ground truth 313 may be embodied in a key fob or personal electronic device, and may carried by the occupant. According to an example embodiment, information comprising the ground truth 313 may be stored on a RFID chip and transmitted via a RFID reader for making up part of the feature vector information 310, and/or for providing information for the training stage 314.

According to an example embodiment, a controller 322 may be utilized for orchestrating sensors and feature vector extraction. According to an example embodiment, certain extracted information including weight, RFID information, facial geometry, vocal quality, etc., may be associated with a particular occupant and may be utilized in establishing linkage between the occupant, a particular identity, and any personalized settings 326 associated with the identity. For example, personalized settings 326 can include seat position, mirror position, radio station, climate control settings, etc. According to an example embodiment, the personalized settings 326 may be extracted by various sensors. According to an example embodiment, information related to the personalized settings 326 may be processed by the controller 322. In an example embodiment, the personalized settings 326 may be stored for learning or refining settings associated with a particular identity. In another example embodiment, the personalized settings 326 may be read from memory by the controller 322 to provide setting when an occupant has been identified and has a corresponding set of stored personalized settings 326.

According to an example embodiment, the feature vector information 310 may be analyzed to determine if there is a match with previously stored information. Based on this analysis, either a training stage 314 or a recognition stage 320 may be implemented. In an example embodiment, feature vector information 310 may need to be measured a number of times (for example, to eliminate noise, etc.) or to determine if the measurements have converged 316 to an average or mean value that is a reliable indicator. In an example embodiment, converged 316 data may be used in the recognition stage 320 for determining an identity from the feature vector information 310.

According to an example embodiment, the controller 322 may provide a signal or command for a prompt or greeting 324 to be announced to the occupant based on the feature vector information 310 and whether a match was made with the read personalized features 328. For example, if a match is determined, the prompt or greeting 324 may announce: "Hello again, you are Alice." According to another example embodiment, if there is no match, the prompt or greeting may announce: "I don't recognize you, please tell me your first name." According to an example embodiment, the speech recognition or feature extraction module or processor 308 may then process a response picked up from the microphone, and begin the process of learning the unrecognized occupant, provided that the system preferences are set to a "learn new occupant" mode.

Figure 4:
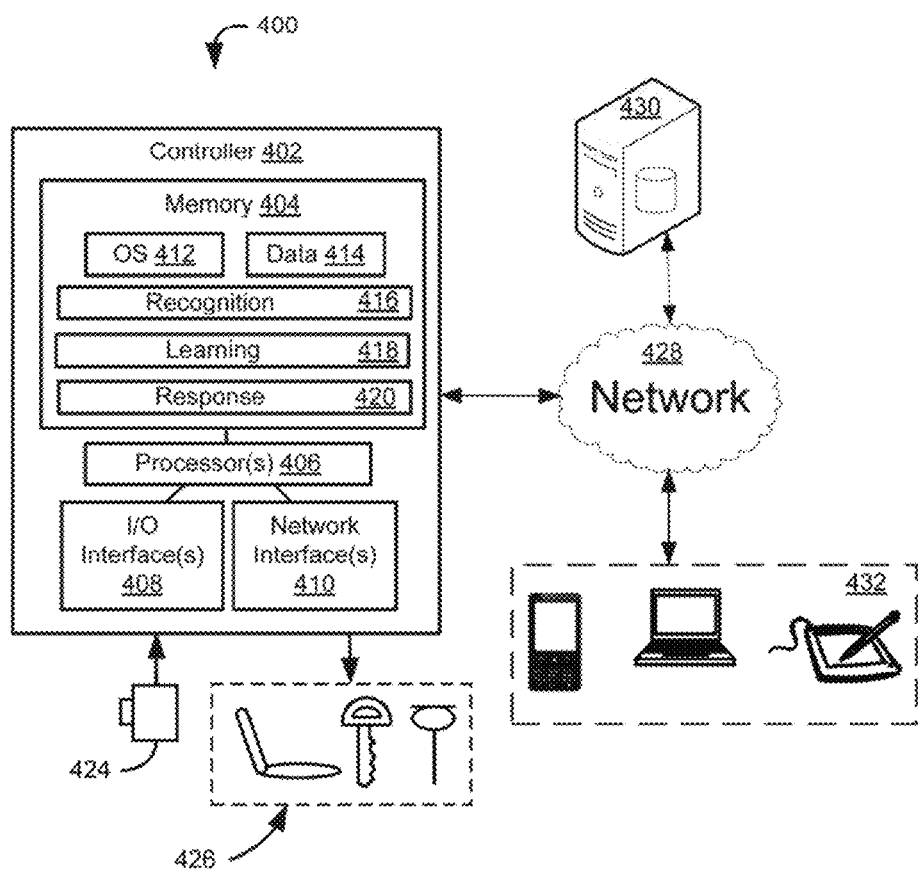
FIG. 4 is a block diagram of a vehicle occupant recognition system, according to an example embodiment of the invention.

FIG. 4 is a block diagram of a vehicle occupant recognition system 400, according to an example embodiment of the invention. The system 400 may include a controller 402 that is in communication with one or more cameras 424. One or more images from the one or more cameras 424 may be processed by the controller 402, and certain features may be extracted from the one or more images to provide feature vector information (as in the feature vector information 310 of FIG. 3). According to an example embodiment, the controller may receive, by one or more input/output interfaces 408, information from other devices 426, which may include a seat weight sensor, a microphone, a key fob, etc. According to an example embodiment, the controller 402 includes a memory 404 in communication with one or more processors 406. The one or more processors may communicate with the camera 424 and/or the devices 426 via one or more input/output interfaces 408. According to an example embodiment, the memory 404 may include one or more modules that may provide computer readable code for configuring the processor to perform certain special functions. For example, the memory may include a recognition module 416. According to an example embodiment, the memory may include a learning module 418. According to example embodiments, the recognition module 416 and the learning module 418 may work in conjunction with the one or more processors 406, and may be utilized for learning or recognizing features in the captured and processed images from the camera 424, or from the devices 426. In an example embodiment, the recognition module 416 may be utilized for determining matches associated with input from the devices 426 and the camera 424.

In accordance with an example embodiment, the memory may include an interpretation/output or response module 420 that may provide commands or other information based on the recognition or non-recognition of an occupant. In example embodiments, commands or other information may include audible prompts, visual prompts, or signals for controlling various operations associated with the vehicle, as previously discussed.

According to an example embodiment, the controller may include one or more network interfaces 410 for providing communications between the controller and a remote server 430 via a wireless network 428. According to example embodiments, the remote server 430 may be used for gathering information, communicating with the controller 402, and/or for providing software or firmware updates to the controller 402 as needed. According to an example embodiment, the controller may communicate with one or more user devices 432 via the network 428. For example, the user devices 432 can include cell phones, computer, tablet computer, etc. According to an example embodiment, the one or more user devices 432 may be utilized to communicate with and remotely control functions associated with the controller 402.

Figure 5:
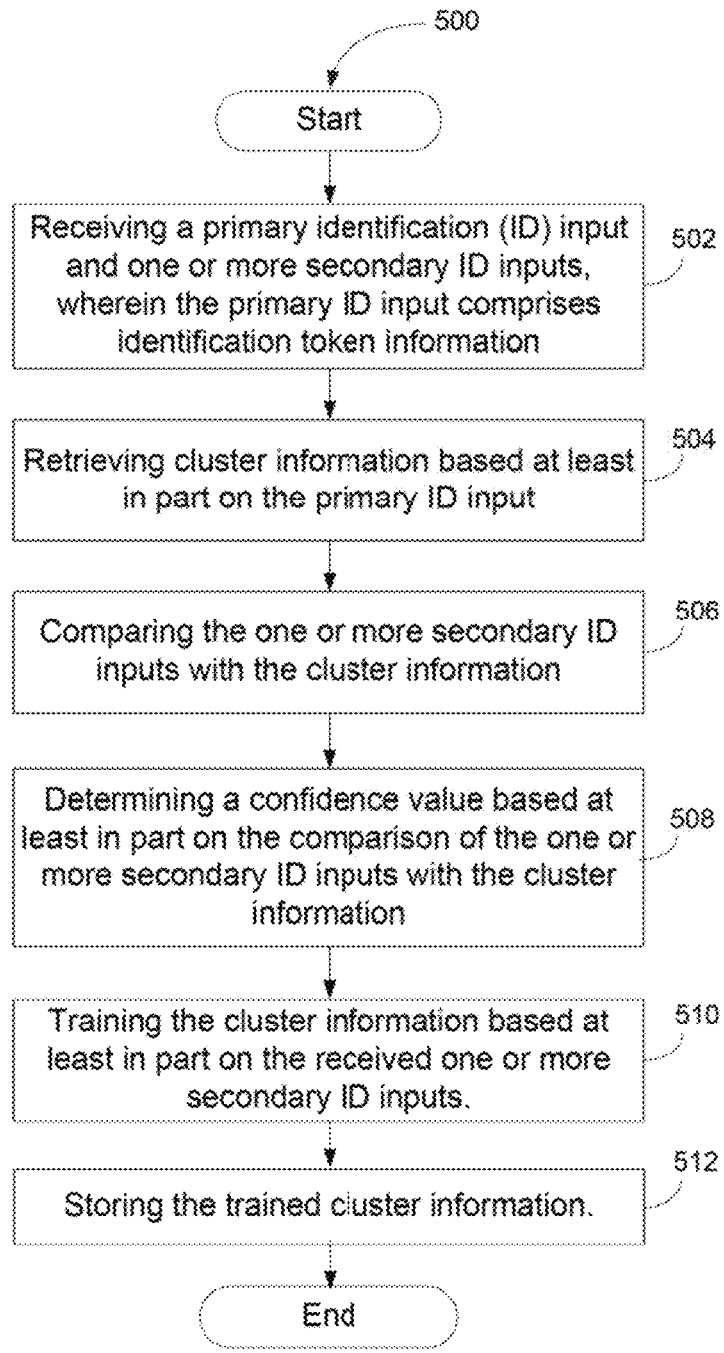
FIG. 5 is a flow diagram of an example method for learning the identity of an occupant of a vehicle, according to an example embodiment of the invention.

FIG. 5 is a flow diagram of an example method for learning an identity of an occupant of a vehicle, according to an example embodiment of the invention. The method 500 starts in block 502, and according to an example embodiment of the invention includes receiving a primary identification (ID) input and one or more secondary ID inputs, wherein the primary ID input comprises identification token information. In block 504, the method 500 includes retrieving cluster information based at least in part on the primary ID input. In block 506, the method 500 includes comparing the one or more secondary ID inputs with the cluster information. In block 508, the method 500 includes determining a confidence value based at least in part on the comparison of the one or more secondary ID inputs with the cluster information. In block 510, the method 500 includes training the cluster information based at least in part on the received one or more secondary ID inputs. In block 512, the method 500 includes storing the trained cluster information. The method 500 ends after block 512.

According to example embodiments, situations may arise where a learned or authorized user, may lend his/her primary ID to another learned or authorized user, and the system may provide several alternatives for dealing with this type of situation. In one example embodiment, when cluster information (which can take the form of one or more feature vectors) is retrieved based on a primary ID (for example a key fob) and it doesn't match well with the secondary ID inputs (for example, weight, visible features, safety belt length), the system may require a tertiary ID input, for example, a fingerprint, a code, or a spoken phrase. Continuing this example, and according to another example embodiment, the system may instead search a database for cluster information associated with another known occupant that matches well (i.e., having correlation above a predefined threshold) with the secondary ID inputs. In this example embodiment, the system may provide a visual or audible prompt or greeting such as "You are not Bob, you are Jane." According to example embodiments, the system may utilize a previously stored list of approved users and associated cluster information for allowing approved users to borrow each other's key fobs for example.

According to example embodiments, situations may arise where a learned or authorized user, may lend his/her primary ID to another unknown or previously unauthorized user, and the system may provide several alternatives for dealing with this type of situation. In one example embodiment, when cluster information is retrieved based on a primary ID and it doesn't match well with the secondary ID inputs the system may require a tertiary ID input, for example, a fingerprint, a code, or a spoken phrase. In another example embodiment, the system may call the phone of the owner or the last known driver to seek permission to let the unknown user operate the vehicle. In this example embodiment, the system may provide a visual or audible prompt or greeting such as "You are not an authorized user."

According to an example embodiment, the identification token information may include information provided by an occupant. The provide information may include, for example, an unlock code, a thumb print, or other bio identifier. According to an example embodiment, the provided information may be stored on one or more of a radio frequency identification (RFID) tag, a barcode, a magnetic strip, a key fob, or a non-volatile memory. According to an example embodiment, the secondary ID inputs may include one or more of: weight, weight distribution, image features, audible features associated with the occupant of the vehicle or other identification data associated with the occupant of the vehicle. According to an example embodiment, the cluster information may include an indication of prior association between the primary ID input and the one or more secondary ID inputs. According to an example embodiment, the indication may include one or more degrees of relative association. Example embodiments may further include outputting information, commands, etc., based at least in part on comparing of the one or more secondary ID inputs with the cluster information. According to an example embodiment, training the cluster information is further based at least in part on the determined confidence value. According to an example embodiment, training the cluster information may include updating a mean and variance of the cluster information based at least in part on one or more of the received secondary ID inputs.

Example embodiments may include a vehicle that includes a primary reader for receiving input from a primary identification (ID) device; one or more secondary ID input devices; at least one memory for storing data and computer-executable instructions; and one or more processors configured to access the at least one memory and further configured to execute computer-executable instructions for receiving a primary ID input from the primary reader and one or more secondary ID inputs from the one or more secondary ID input devices; retrieving cluster information from the at least one memory associated with the vehicle based at least in part on the primary ID input; comparing the one or more secondary ID inputs with the cluster information; determining a confidence value based at least in part on the cluster information or on the comparison of the one or more secondary ID inputs with the cluster information; and training the cluster information based at least in part on the received one or more secondary ID inputs. According to an example embodiment, at least a speaker or display may be included for prompting an occupant of the vehicle.

According to an example embodiment, the one or more secondary ID input devices may include sensors for measuring weight or weight distribution associated with an occupant of the vehicle, a camera for capturing image features associated with an occupant of the vehicle, or a microphone for capturing audible features associated with the occupant. According to an example embodiment, the cluster information may include an indication of prior association between the primary ID input and the one or more secondary ID inputs. According to an example embodiment, the indication may include one or more degrees of relative association. According to an example embodiment, the one or more processors are further configured for outputting information based at least in part on comparing the one or more secondary ID inputs with the cluster information. According to an example embodiment, training the cluster information is further based at least in part on the determined confidence value. According to an example embodiment, training the cluster information includes updating a mean and variance of the cluster information based at least in part on one or more of the received secondary ID inputs.

Figure 6:
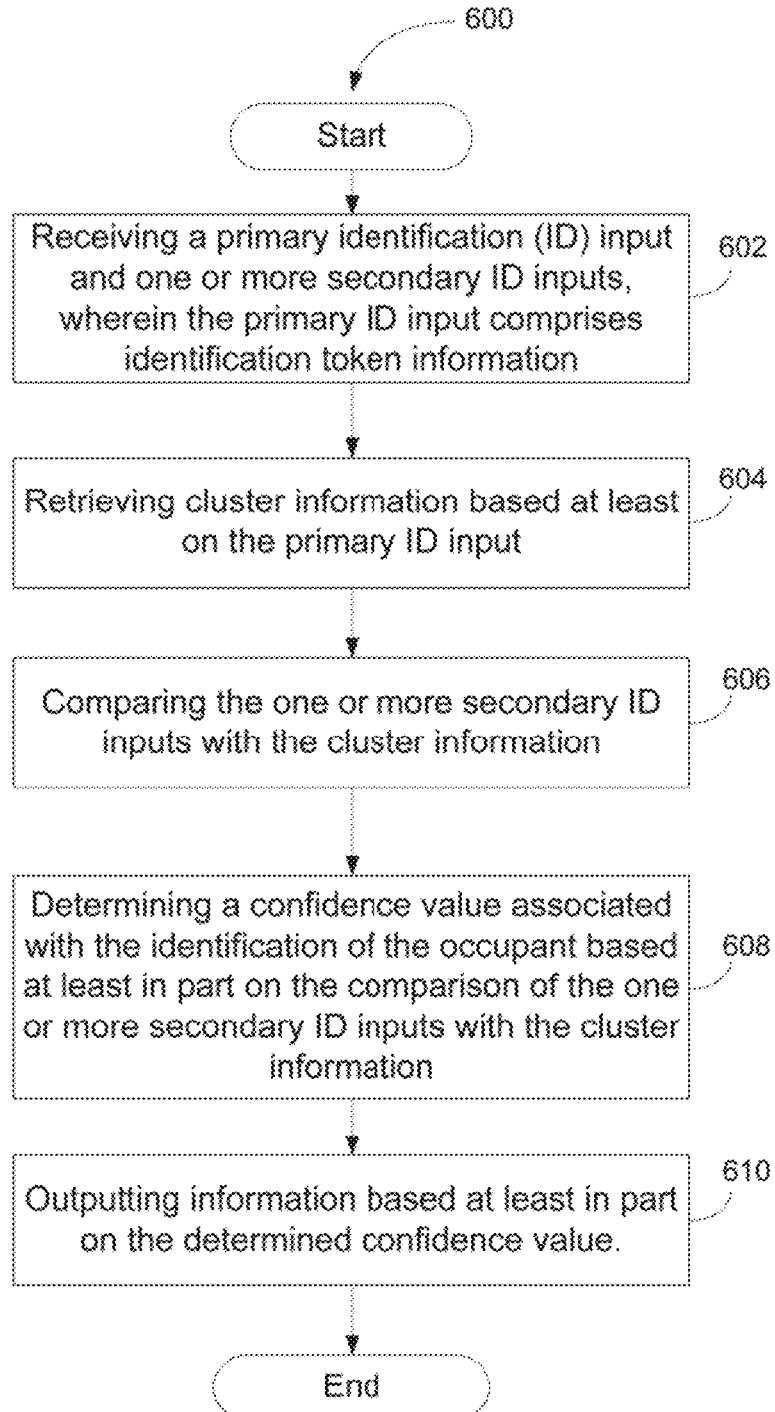
FIG. 6 is a flow diagram of an example method for identifying an occupant of a vehicle, according to an example embodiment of the invention.

FIG. 6 is a flow diagram of an example method for identifying an occupant of a vehicle once the identity has been learned, according to an example embodiment of the invention. The method 600 starts in block 602, and according to an example embodiment of the invention includes receiving a primary identification (ID) input and one or more secondary ID inputs, wherein the primary ID input comprises identification token information. In block 604, the method 600 includes retrieving cluster information based at least on the primary ID input. In block 606, the method 600 includes comparing the one or more secondary ID inputs with the cluster information. In block 608, the method 600 includes determining a confidence value associated with the identification of the driver based at least in part on the comparison of the one or more secondary ID inputs with the cluster information. In block 610, the method 600 includes outputting information based at least in part on the determined confidence value. The method 600 ends after block 610.

According to an example embodiment, the identification token information may include information stored on one or more of a radio frequency identification (RFID) tag, a bar code, a magnetic strip, a key fob, or a non-volatile memory. According to an example embodiment, the secondary ID inputs may include one or more of: weight or weight distribution associated with the driver of the vehicle image features associated with the driver of the vehicle, or audible features associated with the driver of the vehicle. According to an example embodiment, the cluster information may include an indication of prior association between the primary ID input and the one or more secondary ID inputs. An example embodiment may include training the cluster information based at least in part on one or more of the received one or more secondary ID inputs or determined confidence value. According to an example embodiment, training the cluster information may include updating a mean and variance of the cluster information. According to an example embodiment, outputting information may include one or more of an audible or visual prompt or greeting, a command for setting personalized features of the vehicle, or a predetermined command.

Example embodiments may include a vehicle that may include at least one primary reader for receiving input from a primary identification (ID) device; one or more secondary ID input devices; at least one memory for storing data and computer-executable instructions; and one or more processors configured to access the at least one memory and further configured to execute computer executable instructions for: receiving a primary ID input from the primary reader and one or more secondary ID inputs; retrieving cluster information from the at least one memory based at least in part on the primary ID input; comparing the one or more secondary ID inputs with the cluster information; determining a confidence value associated with an identification of an occupant of the vehicle based at least in part on the cluster information or on the comparison of the one or more secondary ID inputs with the cluster information; and outputting information based at least in part on the determined confidence value.

According to example embodiments, certain technical effects can be provided, such as creating certain systems, methods, and apparatus that identify a user and provide user preferences. Example embodiments of the invention can provide the further technical effects of providing systems, methods, and apparatus for learning a new user. Example embodiments of the invention can provide the further technical effects of providing systems, methods, and apparatus for learning preferences of a user.

In example embodiments of the invention, the vehicle occupant recognition system 400 may include any number of hardware and/or software applications that are executed to facilitate any of the operations. In example embodiments, one or more input/output interfaces may facilitate communication between the vehicle occupant recognition system 400 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the vehicle occupant recognition system 400. The one or more input/output interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the vehicle occupant recognition system 400 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network, any wired network, any wireless network, etc., for communication with external devices and/or systems. According to an example embodiment, a Bluetooth MAC address of a personal device may be used as part of the identification or learning process for a vehicle occupant.

As desired, embodiments of the invention may include the vehicle occupant recognition system 400 with more or less of the components illustrated in FIGS. 1 through 4.

Certain embodiments of the invention are described above with reference to block diagrams and flow diagrams of systems and methods and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method comprising executing computer-executable instructions by one or more processors for identifying an occupant of a vehicle, the method further comprising:
   receiving a primary identification (ID) input and one or more secondary ID inputs, wherein the primary ID input comprises identification token information;
   retrieving cluster information based at least on the primary ID input;
   comparing the one or more secondary ID inputs with the cluster information;
   determining one or more average values associated with the one or more secondary ID inputs;
   identifying the occupant based at least in part on the one or more average values falling within one or more predetermined ranges associated with the one or more secondary ID inputs;
   determining a confidence value associated with the identification of the occupant based at least in part on the comparison of the one or more secondary ID inputs with the cluster information;
   determining one or more vehicle settings based at least in part on the identification of the occupant; and
   outputting information based at least in part on the determined confidence value.

2. The method of claim 1, wherein the identification token information comprises information stored on one or more of a radio frequency identification (RFID) tag, a bar code, a magnetic strip, a key fob, or a non-volatile memory.

3. The method of claim 1, wherein the secondary ID inputs comprise one or more of weight or weight distribution associated with the occupant of the vehicle, image features associated with the occupant of the vehicle, or audible features associated with the occupant of the vehicle.

4. The method of claim 1, wherein the cluster information comprises an indication of prior association between the primary ID input and the one or more secondary ID inputs.

5. The method of claim 1, further comprising training the cluster information based at least in part on one or more of the received one or more secondary ID inputs or the determined confidence value.

6. The method of claim 5, wherein training the cluster information comprises updating a mean and variance of the cluster information.

7. The method of claim 1, wherein outputting the information comprises one or more of an audible or visual prompt or greeting, a command for setting personalized features of the vehicle, or a predetermined command.

8. A vehicle comprising:
   a primary reader for receiving input from a primary identification (ID) device;
   one or more secondary ID input devices;
   at least one memory for storing data and computer-executable instructions; and
   one or more processors configured to access the at least one memory and further configured to execute computer-executable instructions for:
     receiving a primary identification (ID) input from the primary reader and one or more secondary ID inputs;
     retrieving cluster information from the at least one memory based at least in part on the primary ID input;
     comparing the one or more secondary ID inputs with the cluster information;
     determining one or more average values associated with the one or more secondary ID inputs;

identifying an occupant based at least in part on the one or more average values falling within one or more predetermined ranges associated with the one or more secondary ID inputs;

determining a confidence value associated with the identification of the occupant of the vehicle based at least in part on the cluster information or on the comparison of the one or more secondary ID inputs with the cluster information;

determining one or more vehicle settings based at least in part on the identification of the occupant; and outputting information based at least in part on the determined confidence value.

9. The vehicle of claim 8, further comprising at least a speaker or a display for greeting or prompting the occupant of the vehicle.

10. The vehicle of claim 8, wherein the primary ID device comprises information stored on one or more of a radio frequency identification (RFID) tag, a bar code, a magnetic strip, a key fob, or a non-volatile memory.

11. The vehicle of claim 8, wherein the one or more secondary ID input devices comprise one or more of sensors for measuring weight or weight distribution associated with the occupant of the vehicle, a camera for capturing image features associated with the occupant of the vehicle, or a microphone for capturing audible features associated with the occupant of the vehicle.

12. The vehicle of claim 8, wherein the cluster information comprises an indication of prior association between the primary ID input and the one or more secondary ID inputs.

13. The vehicle of claim 8, wherein the one or more processors are further configured for training the cluster information based at least in part on the received one or more secondary ID inputs.

14. The vehicle of claim 13, wherein training the cluster information is further based at least in part on the determined confidence value.

15. The vehicle of claim 13, wherein training the cluster information comprises updating a mean and variance of the cluster information based at least in part on one or more of the received secondary ID inputs.

16. The vehicle of claim 13, wherein outputting information comprises one or more of an audible or visual prompt or greeting, a command for setting personalized features of the vehicle, or a predetermined command.

17. An apparatus comprising:
at least one memory for storing data and computer-executable instructions; and
one or more processors configured to access the at least one memory and further configured to execute computer-executable instructions for:
receiving a primary identification (ID) input and one or more secondary ID inputs;
retrieving cluster information from the at least one memory based at least in part on the primary ID input;
comparing the one or more secondary ID inputs with the cluster information:
determining one or more average values associated with the one or more secondary ID inputs;
identifying an occupant based at least in part on the one or more average values falling within one or more predetermined ranges associated with the one or more secondary ID inputs;
determining a confidence value associated with the identification of the occupant of a vehicle based at least in part on the cluster information or on the comparison of the one or more secondary ID inputs with the cluster information;
determining one or more vehicle settings based at least in part on the identification of the occupant; and
outputting information based at least in part on the determined confidence value.

18. The apparatus of claim 17, wherein the primary ID input comprises information stored on one or more of a radio frequency identification (RFID) tag, a bar code, a magnetic strip, a key fob, or a non-volatile memory.

19. The apparatus of claim 17, wherein the secondary ID inputs comprise one or more of weight or weight distribution associated with the occupant of the vehicle, image features associated with the occupant of the vehicle, or audible features associated with the occupant of the vehicle.

20. The apparatus of claim 17, wherein the cluster information comprises an indication of prior association between the primary ID input and the one or more secondary ID inputs, wherein the indication comprises a relative degree of association.

21. The apparatus of claim 17, wherein the one or more processors are further configured for training the cluster information based at least in part on the received one or more secondary ID inputs.

22. The apparatus of claim 21, wherein the training of the cluster information is further based at least in part on the determined confidence value.

23. The apparatus of claim 21, wherein the training of the cluster information comprises updating a mean and variance of the cluster information based at least in part on one or more of the received secondary ID inputs.

24. The apparatus of claim 17, wherein the outputting of the information comprises one or more of an audible or visual prompt or greeting, a command for setting personalized features of the vehicle, or a predetermined command.

25. A non-transitory computer program product, comprising a computer-usable medium having a computer-readable program code embodied therein, said computer-readable program code adapted to be executed to implement a method for learning an identity of an occupant of a vehicle, the method further comprising: receiving a primary identification (ID) input and one or more secondary ID inputs; retrieving cluster information based at least on the primary ID input:
comparing the one or more secondary ID inputs with the cluster information;
determining one or more average values associated with the one or more secondary ID inputs;
identifying the occupant based at least in part on the one or more average values falling within one or more predetermined ranges associated with the one or more secondary ID inputs;
determining a confidence value associated with the identification of the occupant of a vehicle based at least in part on the cluster information or on the comparison of the one or more secondary ID inputs with the cluster information; determining one or more vehicle settings based at least in part on the identification of the occupant; and outputting information based at least in part on the determined confidence value.

26. The non-transitory computer program product of claim 25, wherein the primary ID input comprises information stored on one or more of a radio frequency identification (RFID) tag, a bar code, a magnetic strip, a key fob, or a non-volatile memory and wherein the secondary ID inputs comprise one or more of weight or weight distribution associated with the occupant of the vehicle, image features associated with the occupant of the vehicle, or audible features associated with the occupant of the vehicle.

27. The non-transitory computer program product of claim 25, wherein the cluster information comprises an indication of prior association between the primary ID input and the one or more secondary ID inputs.

28. The non-transitory computer program product of claim 25, further comprising training the cluster information based at least in part on the received one or more secondary ID inputs.

29. The non-transitory computer program product of claim 28, wherein training the cluster information is further based at least in part on the determined confidence value.

30. The non-transitory computer program product of claim 28, wherein training the cluster information comprises updating a mean and variance of the cluster information based at least in part on one or more of the received secondary ID inputs.

* * * * *